US008316117B2

(12) United States Patent
Nguyen et al.

(10) Patent No.: US 8,316,117 B2
(45) Date of Patent: Nov. 20, 2012

(54) PERSONAL PRESENTITY PRESENCE SUBSYSTEM

(75) Inventors: Hong Thi Nguyen, Atlanta, GA (US); Michael Sean Denny, Sharpsburg, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 599 days.

(21) Appl. No.: 11/524,668

(22) Filed: Sep. 21, 2006

(65) Prior Publication Data

US 2008/0077696 A1 Mar. 27, 2008

(51) Int. Cl.
*G06F 15/16* (2006.01)
*G06F 15/177* (2006.01)
*G06F 15/173* (2006.01)

(52) U.S. Cl. ........ 709/222; 709/201; 709/202; 709/203; 709/204; 709/205; 709/206; 709/220; 709/221; 709/223; 709/224; 709/225; 709/226

(58) Field of Classification Search ........... 709/201–229
See application file for complete search history.

(56) References Cited

U.S. PATENT DOCUMENTS

| | | | |
|---|---|---|---|
| 5,675,733 A | 10/1997 | Williams | |
| 5,720,771 A | 2/1998 | Snell | |
| 5,793,365 A | 8/1998 | Tang | |
| 5,796,393 A | 8/1998 | MacNaughton | |
| 5,812,639 A | 9/1998 | Bartholomew | |
| 5,926,179 A | 7/1999 | Matsuda | |
| 6,047,327 A | 4/2000 | Tso | |
| 6,058,420 A | 5/2000 | Davies | |
| 6,108,709 A | 8/2000 | Shinomura | |
| 6,151,507 A | 11/2000 | Laiho | |
| 6,219,045 B1 | 4/2001 | Leahy et al. | |
| 6,286,033 B1 | 9/2001 | Kishinsky | |
| 6,301,609 B1 | 10/2001 | Aravamudon | |
| 6,425,006 B1 | 7/2002 | Chari | |
| 6,429,893 B1 | 8/2002 | Xin | |
| 6,466,261 B1 | 10/2002 | Nakamura | |
| 6,546,005 B1 | 4/2003 | Berkley | |
| 6,553,416 B1 | 4/2003 | Chari | |
| 6,584,494 B1 | 6/2003 | Manabe | |
| 6,591,094 B1 | 7/2003 | Bentley | |

(Continued)

FOREIGN PATENT DOCUMENTS

WO  PCT/US03/14671  5/2003

(Continued)

OTHER PUBLICATIONS

Boyer et al., "Presence Awareness tools for virtual enterprise", 1998, 6 pages—Virtual Enterprise workshop, Citeseer.*

(Continued)

*Primary Examiner* — Catherine Thiaw
(74) *Attorney, Agent, or Firm* — Thomas, Kayden, Horstemeyer & Risley, LLP (57) ABSTRACT

A personal presentity presence service provides support for heterogeneous presentities. Presentity types including personal presentities are registered with a presentity manifest store that includes information such as type names, addresses of applications associated with actions related to the presentity type, application parameters, icons for watcher application, and the like. Personal presentity service identifies the personal presentity types associated with the user and automatically organizes these into a personal presence group for management and presentation purposes. Users (watchers) can then register for different groups of personal presentities, which are devices and systems personally associated with the user, based on a type of presentity and receive updated presence information.

20 Claims, 5 Drawing Sheets

U.S. PATENT DOCUMENTS

| | | |
|---|---|---|
| 6,654,790 B2 | 11/2003 | Ogle |
| 6,658,095 B1 | 12/2003 | Yoakum |
| 6,665,375 B1 | 12/2003 | Forlenza |
| 6,668,169 B2 | 12/2003 | Burgan |
| 6,671,693 B1 | 12/2003 | Marpe et al. |
| 6,727,811 B1 | 4/2004 | Fendis |
| 6,731,308 B1 | 5/2004 | Tang |
| 6,757,365 B1 | 6/2004 | Bogard |
| 6,757,722 B2 * | 6/2004 | Lonnfors et al. ............ 709/220 |
| 6,771,173 B1 | 8/2004 | Clayton |
| 6,816,578 B1 | 11/2004 | Kredo |
| 6,879,677 B2 | 4/2005 | Trandal |
| 6,944,555 B2 | 9/2005 | Blackett |
| 6,954,136 B2 | 10/2005 | Sauer |
| 6,965,935 B2 | 11/2005 | Diong |
| 6,968,052 B2 | 11/2005 | Wullert, II |
| 6,968,179 B1 * | 11/2005 | De Vries ................... 455/414.1 |
| 6,976,092 B1 | 12/2005 | Daniell et al. |
| 6,987,840 B1 | 1/2006 | Bosik |
| 6,993,327 B2 | 1/2006 | Mathis |
| 7,015,806 B2 | 3/2006 | Naidoo |
| 7,020,696 B1 * | 3/2006 | Perry et al. .................. 709/223 |
| 7,043,530 B2 | 5/2006 | Isaacs |
| 7,058,036 B1 | 6/2006 | Yu |
| 7,072,941 B2 | 7/2006 | Griffin et al. |
| 7,111,044 B2 | 9/2006 | Lee |
| 7,262,690 B2 | 8/2007 | Heaton |
| 7,302,270 B1 * | 11/2007 | Day ........................... 455/456.1 |
| 7,313,617 B2 | 12/2007 | Malik |
| 7,321,921 B2 | 1/2008 | Malik |
| 7,324,826 B2 | 1/2008 | Carey |
| 7,353,455 B2 | 4/2008 | Malik |
| 7,370,278 B2 | 5/2008 | Malik |
| 7,392,306 B1 | 6/2008 | Donner et al. |
| 7,395,329 B1 | 7/2008 | Holt |
| 7,401,158 B2 | 7/2008 | Beauchamp et al. |
| 7,406,501 B2 | 7/2008 | Szeto et al. |
| 7,472,187 B2 | 12/2008 | Malik |
| 7,483,969 B2 * | 1/2009 | Chavda et al. ............... 709/223 |
| 7,561,041 B2 | 7/2009 | Nguyen et al. |
| 7,624,172 B1 | 11/2009 | Austin-Lane |
| 7,676,550 B1 | 3/2010 | Jachner |
| 7,701,925 B1 | 4/2010 | Mason et al. |
| 7,836,126 B2 | 11/2010 | Thommes et al. |
| 7,956,739 B2 | 6/2011 | Hong et al. |
| 8,090,821 B2 | 1/2012 | Holt et al. |
| 2002/0026483 A1 | 2/2002 | Isaacs |
| 2002/0032740 A1 | 3/2002 | Stern |
| 2002/0035605 A1 | 3/2002 | McDowell |
| 2002/0046299 A1 | 4/2002 | Lefeber |
| 2002/0103008 A1 | 8/2002 | Rahn et al. |
| 2002/0160757 A1 | 10/2002 | Shavit |
| 2003/0018903 A1 | 1/2003 | Greca |
| 2003/0050986 A1 | 3/2003 | Matthews et al. |
| 2003/0097485 A1 | 5/2003 | Horvitz et al. |
| 2003/0217098 A1 | 11/2003 | Bobde et al. |
| 2003/0217142 A1 | 11/2003 | Bobde et al. |
| 2003/0218631 A1 * | 11/2003 | Malik ........................... 345/739 |
| 2004/0003046 A1 | 1/2004 | Grabelsky |
| 2004/0015547 A1 | 1/2004 | Griffin et al. |
| 2004/0015548 A1 | 1/2004 | Lee |
| 2004/0044738 A1 * | 3/2004 | Ohno et al. .................. 709/206 |
| 2004/0085205 A1 | 5/2004 | Yeh |
| 2004/0086093 A1 | 5/2004 | Schranz |
| 2004/0153506 A1 * | 8/2004 | Ito et al. ....................... 709/204 |
| 2004/0171396 A1 | 9/2004 | Carey |
| 2004/0177118 A1 | 9/2004 | Mason |
| 2004/0177134 A1 * | 9/2004 | Lonnfors et al. ............ 709/220 |
| 2004/0179038 A1 | 9/2004 | Blattner |
| 2004/0179039 A1 | 9/2004 | Blattner |
| 2004/0205175 A1 | 10/2004 | Kammerer |
| 2004/0221224 A1 | 11/2004 | Blattner |
| 2004/0267887 A1 | 12/2004 | Berger |
| 2005/0010644 A1 | 1/2005 | Brown |
| 2005/0068167 A1 | 3/2005 | Boyer et al. |
| 2005/0166154 A1 | 7/2005 | Wilson |
| 2005/0210104 A1 | 9/2005 | Torvinen |
| 2005/0216565 A1 * | 9/2005 | Ito et al. ....................... 709/206 |
| 2005/0218206 A1 * | 10/2005 | Ohno et al. .................... 235/375 |
| 2005/0228895 A1 * | 10/2005 | Karunamurthy et al. ...... 709/229 |
| 2006/0004924 A1 * | 1/2006 | Trossen ........................ 709/228 |
| 2006/0030264 A1 | 2/2006 | Morris |
| 2006/0031293 A1 | 2/2006 | Thommes et al. |
| 2006/0031772 A1 * | 2/2006 | Valeski ......................... 715/751 |
| 2006/0167998 A1 * | 7/2006 | Yoshiuchi et al. ............ 709/204 |
| 2006/0242239 A1 * | 10/2006 | Morishima et al. ........... 709/204 |
| 2006/0248184 A1 * | 11/2006 | Wu et al. ...................... 709/224 |
| 2006/0252444 A1 * | 11/2006 | Ozugur ......................... 455/519 |
| 2006/0253593 A1 * | 11/2006 | Jachner ......................... 709/227 |
| 2006/0277296 A1 * | 12/2006 | Matsubara et al. ........... 709/224 |
| 2007/0016649 A1 * | 1/2007 | Nishiki ......................... 709/206 |
| 2007/0027930 A1 | 2/2007 | Alvarado et al. |
| 2007/0083627 A1 * | 4/2007 | Mohammed et al. ......... 709/223 |
| 2007/0121867 A1 * | 5/2007 | Ozugur et al. ............. 379/201.1 |
| 2007/0124469 A1 * | 5/2007 | Mohammed et al. ......... 709/225 |
| 2007/0136475 A1 * | 6/2007 | Leppisaari et al. ........... 709/227 |
| 2007/0150825 A1 * | 6/2007 | Jachner ......................... 715/765 |
| 2007/0182541 A1 * | 8/2007 | Harris et al. .................. 340/506 |
| 2007/0198725 A1 * | 8/2007 | Morris ......................... 709/227 |
| 2007/0208702 A1 | 9/2007 | Morris |
| 2007/0220143 A1 | 9/2007 | Lund et al. |
| 2007/0233854 A1 * | 10/2007 | Bukovec et al. .............. 709/224 |
| 2007/0265859 A1 * | 11/2007 | Jachner ............................. 705/1 |
| 2008/0052384 A1 * | 2/2008 | Marl et al. .................... 709/223 |
| 2008/0133708 A1 | 6/2008 | Alvarado et al. |
| 2008/0184136 A1 | 7/2008 | Malik |
| 2008/0209347 A1 | 8/2008 | Malik |
| 2008/0244026 A1 | 10/2008 | Holt |
| 2010/0114579 A1 | 5/2010 | Ostermann et al. |
| 2010/0219971 A1 * | 9/2010 | Appelman et al. ......... 340/691.3 |
| 2010/0227594 A1 | 9/2010 | De Vries |
| 2010/0299615 A1 | 11/2010 | Miluzzo et al. |
| 2011/0029629 A1 * | 2/2011 | Burtner et al. ................ 709/206 |

FOREIGN PATENT DOCUMENTS

| | | |
|---|---|---|
| WO | PCT/US03/15814 | 5/2003 |
| WO | 03/098449 | 11/2003 |
| WO | 03/100637 | 12/2003 |

OTHER PUBLICATIONS

Adamczyk; Advisory Action mailed Dec. 31, 2008 for U.S. Appl. No. 10/745,199, filed Dec. 23, 2003.

Nguyen; Notice of Allowance mailed Feb. 6, 2009 for U.S. Appl. No. 11/520,262, filed Sep. 13, 2006.

Adamczyk; Non-Final Rejection mailed Jun. 11, 2009 for U.S. Appl. No. 10/745,199, filed Dec. 23, 2003.

Daigle; Interview Summary mailed Jun. 15, 2009 for U.S. Appl. No. 11/304,319, filed Dec. 15, 2005.

Definition of "ACK" from Newton's Telecom Dictionary, CMP Books, 20th Edition, p. 42.

Holt; U.S. Appl. No. 10/144,425, filed May 13, 2002.

Holt; U.S. Appl. No. 12/133,590, filed Jun. 5, 2008.

Malik; U.S. Appl. No. 10/223,859, filed Aug. 19, 2002.

Malik; U.S. Appl. No. 12/059,320, filed Mar. 31, 2008.

Malik; U.S. Appl. No. 10/985,361, filed Nov. 10, 2004.

Malik; U.S. Appl. No. 12/115,004, filed May 5, 2008.

Adamczyk; U.S. Appl. No. 10/745,199, filed Dec. 23, 2003.

Malik; U.S. Appl. No. 10/889,859, filed Jul. 13, 2004.

Malik; U.S. Appl. No. 12/017,999, filed Jan. 22, 2008.

Nguyen; U.S. Appl. No. 11/520,262, filed Sep. 13, 2006.

Daigle; U.S. Appl. No. 11/304,319, filed Dec. 15, 2005.

Holt; Final Rejection mailed Feb. 27, 2006 for U.S. Appl. No. 10/144,425, filed May 13, 2002.

Holt; Final Rejection mailed Jun. 19, 2007 for U.S. Appl. No. 10/144,425, filed May 13, 2002.

Holt; Non-Final Rejection mailed Jan. 3, 2007 for U.S. Appl. No. 10/144,425, filed May 13, 2002.

Holt; Non-Final Rejection mailed Jul. 14, 2006 for U.S. Appl. No. 10/144,425, filed May 13, 2002.

Holt; Non-Final Rejection mailed Aug. 25, 2005 for U.S. Appl. No. 10/144,425, filed May 13, 2002.

Holt; Notice of allowance and Fees Due mailed Jan. 28, 2008 for U.S. Appl. No. 10/144,425, filed May 13, 2002.

Malik; Advisory Action mailed Jun. 11, 2004 for U.S. Appl. No. 10/223,859, filed Aug. 19, 2002.
Malik; Examiner Interview Summary mailed Apr. 21, 2004 for U.S. Appl. No. 10/223,859, filed Aug. 19, 2002.
Malik; Examiner Interview Summary mailed Nov. 14, 2003 for U.S. Appl. No. 10/223,859, filed Aug. 19, 2002.
Malik; Final Rejection mailed Feb. 24, 2004 for U.S. Appl. No. 10/223,859, filed Aug. 19, 2002.
Malik; Final Rejection mailed Sep. 7, 2006 for U.S. Appl. No. 10/223,859, filed Aug. 19, 2002.
Malik; Final Rejection mailed Nov. 21, 2005 for U.S. Appl. No. 10/223,859, filed Aug. 19, 2002.
Malik; Non-Final Rejection mailed Mar. 13, 2006 for U.S. Appl. No. 10/223,859, filed Aug. 19, 2002.
Malik; Non-Final Rejection mailed May 18, 2005 for U.S. Appl. No. 10/223,859, filed Aug. 19, 2002.
Malik; Non-Final Rejection mailed Jun. 6, 2007 for U.S. Appl. No. 10/223,859, filed Aug. 19, 2002.
Malik; Non-Final Rejection mailed Sep. 2, 2003 for U.S. Appl. No. 10/223,859, filed Aug. 19, 2002.
Malik; Non-Final Rejection mailed Oct. 20, 2004 for U.S. Appl. No. 10/223,859, filed Aug. 19, 2002.
Malik; Notice of Allowance and Fees Due mailed Dec. 5, 2007 for U.S. Appl. No. 10/223,859, filed Aug. 19, 2002.
Malik; Pre-Brief Appeal Conference Decision mailed Mar. 15, 2007 for U.S. Appl. No. 10/223,859, filed Aug. 19, 2002.
Mailk; Final Rejection mailed Dec. 5, 2006 for U.S. Appl. No. 10/985,361, filed Nov. 10, 2004.
Malik; Advisory Action mailed Feb. 28, 2007 for U.S. Appl. No. 10/985,361, filed Nov. 10, 2004.
Malik; Non-Final Rejection mailed Jun. 5, 2006 for U.S. Appl. No. 10/985,361, filed Nov. 10, 2004.
Malik; Non-Final Rejection mailed Jun. 19, 2007 for U.S. Appl. No. 10/985,361, filed Nov. 10, 2004.
Malik; Notice of Allowance and Fees Due mailed Jan. 11, 2008 for U.S. Appl. No. 10/985,361, filed Nov. 10, 2004.
Adamczyk; Non-Final Rejection mailed Mar. 26, 2008 for U.S. Appl. No. 10/745,199, filed Dec. 23, 2003.
Malik; Examiner Interview Summary mailed Jan. 4, 2006 for U.S. Appl. No. 10/889,859, filed Jul. 13, 2004.
Malik; Examiner Interview Summary mailed Jun. 5, 2006 for U.S. Appl. No. 10/889,859, filed Jul. 13, 2004.
Malik; Examiner Interview Summary mailed Jun. 19, 2007 for U.S. Appl. No. 10/889,859, filed Jul. 13, 2004.
Malik; Examiner Interview Summary mailed Aug. 2, 2006 for U.S. Appl. No. 10/889,859, filed Jul. 13, 2004.
Malik; Examiner Interview Summary mailed Sep. 27, 2007 for U.S. Appl. No. 10/889,859, filed Jul. 13, 2004.
Malik; Final Rejection mailed Mar. 28, 2006 for U.S. Appl. No. 10/889,859, filed Jul. 13, 2004.
Malik; Final Rejection mailed Dec. 12, 2006 for U.S. Appl. No. 10/889,859, filed Jul. 13, 2004.
Malik; Non-Final Rejection mailed Apr. 9, 2007 for U.S. Appl. No. 10/889,859, filed Jul. 13, 2004.
Malik; Non-Final Rejection mailed Jun. 27, 2006 for U.S. Appl. No. 10/889,859, filed Jul. 13, 2004.
Malik; Non-Final Rejection mailed Nov. 4, 2005 for U.S. Appl. No. 10/889,859, filed Jul. 13, 2004.
Malik; Notice of Allowance and Fees Due mailed Sep. 27, 2007 for U.S. Appl. No. 10/889,859, filed Jul. 13, 2004.
Malik; Non-Final Rejection mailed Oct. 1, 2008 for U.S. Appl. No. 12/017,999, filed Jan. 22, 2008.
Adamczyk; Final Rejection mailed Oct. 14, 2008 for U.S. Appl. No. 10/745,199, filed Dec. 23, 2003.
Nguyen; Non-Final Rejection mailed Oct. 20, 2008 for U.S. Appl. No. 11/520,262, filed Sep. 13, 2006.
Daigle; Non-Final Rejection mailed Nov. 20, 2008 for U.S. Appl. No. 11/304,319, filed Dec. 15, 2005.
Nguyen; Non-Final Rejection mailed Mar. 12, 2009 for U.S. Appl. No. 11/525,008, filed Sep. 21, 2006.
Nguyen; Notice of Allowance mailed Apr. 6, 2009 for U.S. Appl. No. 11/520,262, filed Sep. 13, 2006.
Daigle; Final Office Action mailed Apr. 10, 2009 for U.S. Appl. No. 11/304,319, filed Dec. 15, 2005.
Daigle; Non-Final Rejection mailed Jul. 29, 2009 for U.S. Appl. No. 11/304,341, filed Dec. 15, 2005.
Nguyen; Final Office Action mailed Sep. 15, 2009 for U.S. Appl. No. 11/525,008, filed Sep. 21, 2006.
Jensen; U.S. Appl. No. 12/535,062, filed Aug. 4, 2009.
Adamczyk; Final Office Action mailed Dec. 8, 2009 for U.S. Appl. No. 10/745,199, filed Dec. 23, 2003.
Nguyen; Non-Final Rejection mailed Jan. 22, 2010 for U.S. Appl. No. 11/525,008, filed Sep. 21, 2006.
Malik; Non-Final Office Action mailed Apr. 8, 2010 for U.S. Appl. No. 12/059,320, filed Mar. 31, 2008.
Nguyen; Final Office Action mailed Jul. 16, 2010 for U.S. Appl. No. 11/525,008, filed Sep. 21, 2006.
Holt; Non-Final Office Action mailed Sep. 15, 2010 for U.S. Appl. No. 12/133,590, filed Jun. 5, 2008.
Nguyen; Non-Final Office Action mailed Sep. 24, 2010 for U.S. Appl. No. 12/483,306, filed Jun. 12, 2009.
Malik; Final Office Action mailed Nov. 9, 2010 for U.S. Appl. No. 12/059,320, filed Mar. 31, 2008.
Nguyen; Non-Final Office Action mailed Feb. 2, 2011 for U.S. Appl. No. 11/525,008, filed Sep. 21, 2006.
Holt; Non-Final Office Action mailed Mar. 8, 2011 for U.S. Appl. No. 12/133,590, filed Jun. 5, 2008.
Nguyen; Notice of Allowance mailed Mar. 17, 2011 for U.S. Appl. No. 12/483,306, filed Jun. 12, 2009.
Non-Final Office Action mailed Nov. 28, 2011 for U.S. Appl. No. 12/059,320, filed Mar. 31, 2008.
Malik; Final Office Action mailed Feb. 14, 2012 for U.S. Appl. No. 12/115,004, filed May 5, 2008.
Holt; Notice of Allwoance mailed Sep. 1, 2011 for U.S. Appl. No. 12/133,590, filed Jun. 5, 2008.
Malik; Non-Final Office Action mailed May 17, 2011 for U.S. Appl. No. 12/115,004, filed May 5, 2008.
Nguyen; Final Office Action mailed Jul. 6, 2011 for U.S. Appl. No. 11/525,008, filed Sep. 21, 2006.
Jensen; Non-Final Office Action mailed Jan. 3, 2012 for U.S. Appl. No. 12/535,062, filed Aug. 4, 2009.

* cited by examiner

EXAMPLE PRESENCE SERVICE ARCHITECTURE

FIG. 1

*EXAMPLE PERSONAL PRESENTITY PRESENCE SUBSYSTEM*

*PERSONAL PRESENTITY PRESENCE SERVICE WITH PRESENTITIES AND WATCHER*

PERSONAL PRESENTITY PRESENCE SUBSYSTEM

RELATED APPLICATIONS

The present application may be found to be related to U.S. patent application entitled: "DYNAMICALLY CONFIGURABLE PRESENCE SERVICE", Ser. No. 11/525,008, filed with the USPTO on the same day as this patent application.

TECHNICAL FIELD

Embodiments are related to presence services. More particularly, the disclosed subject matter is related to computer-implemented methods, configurations, systems, and computer program products for facilitating support for dynamic grouping and presentation of personally associated presentity types based on their type.

BACKGROUND

Today's presence standards, models, and presence service implementations typically do not address dynamic categorization of presentities into presentity groups. Many presence applications allow users to manually group presentities into buddy lists such as "my family", "my fellow gamers", "my colleagues", and the like. This may be due to presence services typically assuming a homogeneous presentity population, addressing only one type of presentity, usually persons.

On the other hand, computer technology has evolved sufficiently such that "smart" technology is available in many homes today. From appliances to monitoring systems, many devices are capable of performing multiple tasks, interact with users, and communicated over various types of networks.

SUMMARY

Consistent with embodiments described herein, systems and methods are disclosed for providing support for dynamic categorization and presentation of personally associated presentities based on presentity type(s). Key features or essential features of the claimed subject matter are not necessarily identified in this summary portion.

A presence service is arranged to register and maintain updated information on different presentity types. Embodiments are directed to a personal presence subsystem that is capable of dynamically grouping these different presentities for presentation and management purposes based on their presentity type. In particular, the subsystem can identify and group devices and systems personally associated with a user into a "Personal Presentity" group. "Personal Presentity" types may include devices such as monitoring and entry systems that are typically associated with one individual. Presence applications may be provided presentity type information such that they can subscribe to monitor presence information and associated presentities with groups for presentation and management purposes.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

DETAILED DESCRIPTION

As briefly described above, a personal presentity presence service may include real time configurability for different types of personal presentities. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Referring now to the drawings, aspects, exemplary operating environments, and configurations will be described. While the embodiments will be described in the general context of program modules that execute in conjunction with an application program that runs on an operating system on a personal computer, those skilled in the art will recognize that aspects may also be implemented in combination with other program modules.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Figure 1:
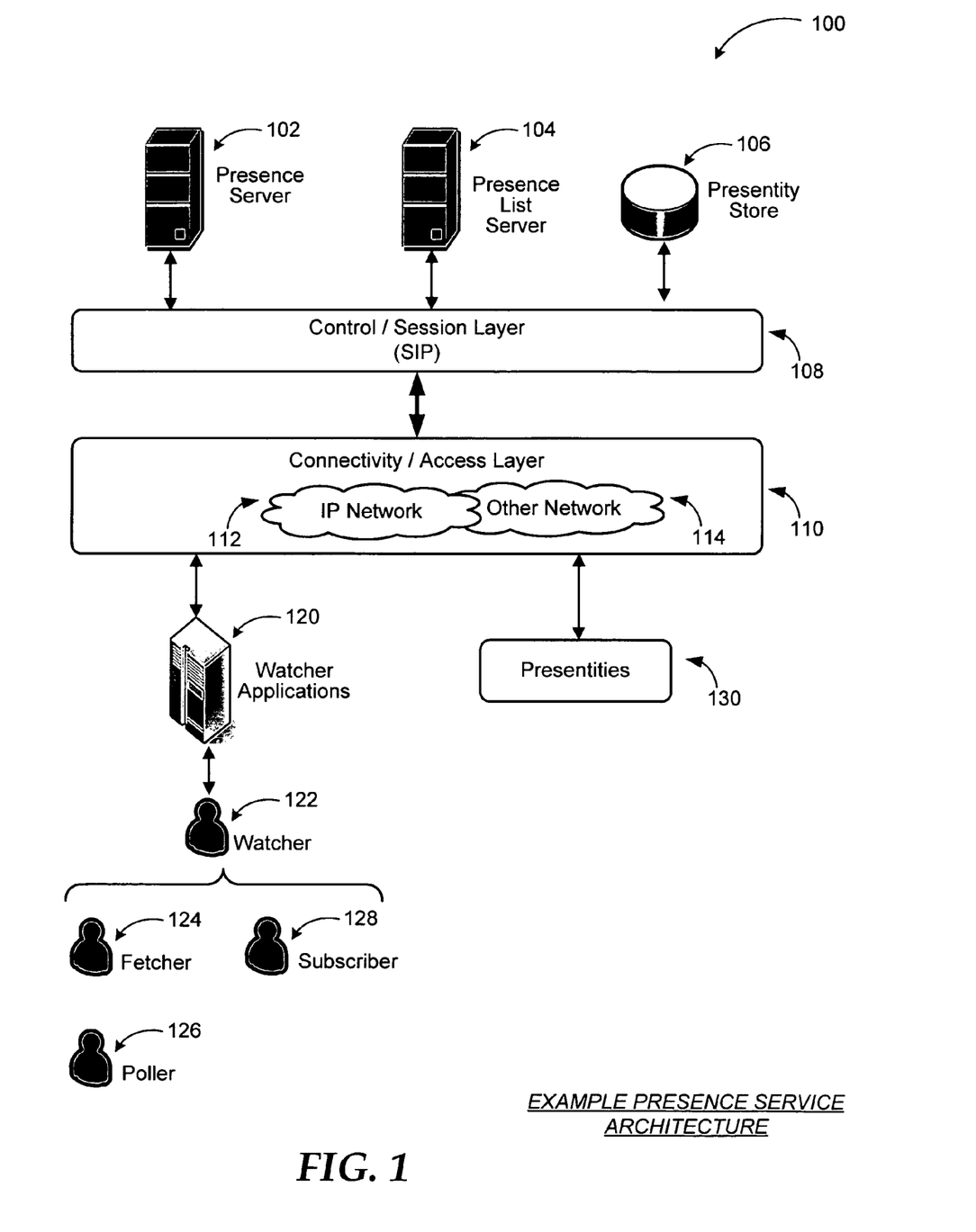
FIG. 1 illustrates a conceptual diagram of a presence service architecture, where example embodiments may be implemented.

FIG. 1 and the following discussion are intended to provide a brief, general description of a suitable computing environment in which the invention may be implemented. With reference to FIG. 1, a conceptual diagram of a presence service architecture 100, where example embodiments may be implemented, is shown. A presence system allows users to subscribe to each other and be notified of changes in state and, typically, for users to exchange a communication with each other. A presence service has two distinct sets of "clients". One set of clients, called "presentities", provides presence information to be stored and distributed. The other set of clients, called "watchers", receives presence information from the service.

Architecture 100 includes at a base level watcher applications 120 and presentities 130 that connect to the backbone of the presence system through IP network 112 or other network(s) 114 of the connectivity and access layer 110. Watcher applications 120 provide an interface for watcher(s) 122. There are two kinds of watchers, called "fetchers" 124 and "subscribers" 128. Fetcher 124 simply requests the current value of some presentity's presence information from the presence server 102. In contrast, subscriber 128 may request notification from the presence server 102 about changes in a presentity's presence information including future changes. A special kind of fetcher 124 is one that fetches information on a regular basis. This is called a "poller" 126.

In a conventional presence system, watcher applications 120 may be executed on computing devices such as cellular phones, Personal Digital Assistants (PDAs), and the like, providing watcher(s) 122 information about the presentities 130 that are typically associated with a particular watcher 122. In a typical presence system scenario, the presentities 130 may include people in a phone subscriber's "buddy list" with the system providing information about location or contact information of the people on the buddy list to the subscriber and enabling the subscriber to contact the presentities 130 through various means. Thus, the presentities 130 in a typical presence system are homogeneous (all persons). Furthermore, the presence services generally operate by registering the presentities 130 along with their attributes requiring a reconfiguration of the buddy list when a new presentity is added or one removed.

According to some embodiments, presentities 130 may include different types of personal presentities 130 such as interface devices (and applications) that may provide a service to the watcher 122. For example, a personal presentity 130 may include a monitoring or entry system configured to provide triggering event(s) to the watcher 122 and facilitate actions in response to the triggering event(s) and the watcher's selection.

Connectivity and access layer 110 includes network infrastructure that is used to provide interconnection between presentity/watcher applications and presence applications at application layer 105 of the system. Connectivity layer 110 may include IP network 112 and other network 114 or a combination of networks. These network(s) 112 and/or 114 may include a secure network such as a home network or an enterprise network, or an unsecure network such as a wireless open network. The networks 112 and/or 114 provide communication between the applications described above. By way of example, and not limitation, the networks 112 and/or 114 may include wired media such as a wired network or direct-wired connection, and wireless media such as acoustic, RF, infrared and other wireless media.

Presence services may be a service component deployed within an IP Multimedia System (IMS) framework. Control and session layer 108 is arranged to facilitate communication sessions between the physical devices and the applications, as well as between the applications and any network resources such as data stores of the IMS framework. IMS is an open-systems architecture that supports a range of IP-based services over both packet switch and circuit switch networks, employing both wireless and fixed access technologies.

IMS provides services and control such as adding call session control to the packet network, enabling peer-to-peer real-time services such as voice or video over a packet-switched domain, and scalable common service control (based on SIP) for giving the ability to manage parallel user services. In a mixed multimedia environment, IMS may provide the ability to pick and mix various multimedia flows in single or multiple sessions and can handle real-time voice, video, and data. IMS also provides access to IP based services independent of the underlying access technology (mobile or fixed). IMS applications and drivers may include voice telephony (VoIP), video telephony, web browsing, presence-based services, push-to media services (e.g. push-to-talk, push-to-view, push-to-video, etc.), group chat, instant messaging, multimedia conferencing, content sharing/data transfer, and the like.

Control and session layer 108 within an IMS framework may include components such as proxy-call state control function ("P-CSCF"), which is typically a first point of contact and may provide privacy control, quality of service ("QoS"), authorization of local services, and similar functionalities. P-CSCF may interacts through SIP with interrogating-call state control function ("I-CSCF"), which may provide an access point functionality to the network and enable protection of a topology and configuration of the network. I-CSCF may interact through SIP with serving-call state control function ("S-CSCF"), which provides session control services such as registration, accounting, and the like. Both I-CSCF and S-CSCF may interact with a home subscriber service ("HSS"), which can be used as a data store service for storing presence information, e.g. where the user can be reached. An IMS architecture may include additional components such as a subscriber locating function, a trunking signaling gateway, a media resource function controller, and the like. Furthermore, control and session layer 108 may also be embodied within a framework other than IMS.

At an application layer 105 of architecture 100 are presence server 102, presence list server 104, and presentity store 106. The application layer 105 may also include one or more applications associated with providing additional services to the watchers 122 integrated with the unified presence service.

Presence server 102 is arranged to coordinate exchange of information between the presentities 130 and watchers 122, as well as different data stores of the system. For example, presence server 102 may receive information associated with a location of a watcher 122 and notify the watcher 122 through an application (or device) based on the watcher's location about status of the watcher's registered presentities 130. Presence list server 104 may maintain a list of the presentities 130 associated with each watcher 122 and update presentity store 106, where information about the presentities 130 and their attributes are stored.

According to some embodiments, watcher application 120 may provide one or more user interfaces ("UIs") to enable the watchers 122 and the presentities 130 to receive and provide information, such as VoIP communications, action selections, alphanumeric entries, and the like.

Interface devices executing watcher 122 and presentity 130 applications as well as servers of the application layer 105 may include or may be part of a computing device. Such a computing device may include, but is not limited to, a hand-held computer, a Personal Digital Assistant (PDA), a TV, an MP3 player, a smart remote control device, and the like. Computing devices typically include a processing device and a system memory. Computing devices may also include additional processing devices, which may be dedicated processors or enable distributed processing by coordinating with a main processing device. The system memory may be volatile (such as RAM), non-volatile (such as ROM, flash memory, etc.) or some combination of the two. System memory typically provides an environment for an operating system to be executed for controlling the operation of the computing device and execution of other programs (applications). The watcher application 120, a subscriber location application, two-way communication applications, imaging or video communication applications are examples of programs or program modules that may be executed in the system memory. These applications may be an integrated part of a single program or separate applications. They may communicate with other applications running on the computing device or on other devices.

The computing devices may have additional features or functionality. For example, the computing devices may also include data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. The system memory and storage devices are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device. Any such computer storage media may be part of the computing device.

Computing devices may also include input devices such as a keyboard, a keypad, a voice input device, a touch input device, a camera etc. Furthermore, output devices such as a display, a speaker, a printer, etc. may also be included. These devices are well known in the art.

Communication connections may be included in the computing devices to allow the device to communicate with other computing devices executing above described applications, such as over a network in a distributed computing environment, for example, an intranet or the Internet. Communication connections may include media that may be embodied by computer readable instructions, data structures, program modules, or other data in a modulated data signal, such as a carrier wave or other transport mechanism, and include any information delivery media.

By way of example, and not limitation, communication media may include wired media such as a wired network or direct-wired connection, and wireless media such as acoustic, RF, infrared and other wireless media. The term computer readable media as used herein refers to both storage media and communication media. The implementation of embodiments for interface devices and servers of a personal presentity presence subsystem is not limited to the computing devices described above. Other computing devices with different components, configurations, and the like, may be used to execute computer readable instructions implementing embodiments described herein without departing from a scope and spirit of the disclosed subject matter.

Figure 2:
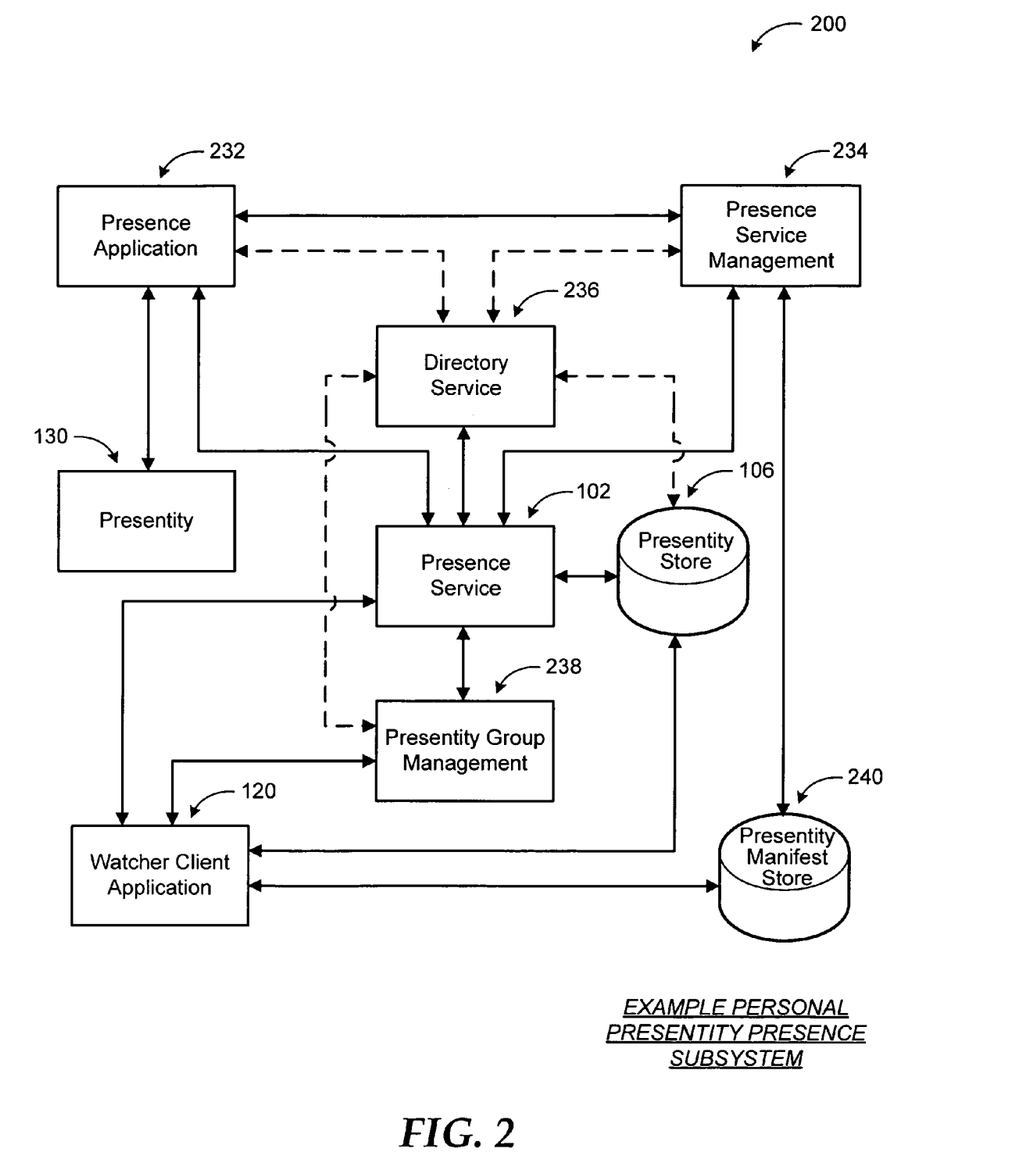
FIG. 2 illustrates main components of an example personal presentity presence subsystem architecture.

FIG. 2 illustrates main components of an example personal presentity presence subsystem 200. According to some embodiments, a personal presentity presence subsystem 200 may provide for real time configurability of a presence service to dynamically determine and configure the actions that can be taken when a presence notification has been received. In particular, certain presentities 130 are identified as "personal presentities" and are automatically grouped into a personal presentity group. According to other embodiments, the system may support different types (heterogeneous) of presentities 130 which may have different associated service actions.

The support for heterogeneous presentities 130 with different associated service actions may be accomplished by employing a presentity manifest. For each presentity a presentity manifest including a type of the presentity, a list of associated actions, a presentity group information, and a list of authorized watchers 122 may be stored and maintained by the presence server 102. Furthermore, the list of associated actions may include for each action a network address of an application or system to connect to, one or more parameters for the application or system associated with the action, and presentation information (e.g. icons to be used in a UI for the action).

In an operation, presence application 232 may monitor presence of presentities such as presentity 130 and update presence server 102 with the status of monitored presentities 130. Presence application 232 may also register any new presentity type with presentity service management component 234. Moreover, presence application 232 may optionally register presentities 130 with directory service 236.

Presence service management component 234 may register any applications associated with presentities 130 with presence server 102 as well as register any new presentities 130 with directory service 236. According to some embodiments, presence service management component 234 may store new presentity types and manifests of the presentities 130 with presentity manifest store 240.

Watcher application 120 may be dynamically reconfigured based on the presentity manifests in presentity manifest store 240. For example, profiles, associated actions, and icons for each presentity 130 displayed on a watcher application UI may be updated when the presentity manifest is modified in presentity manifest store 240. Watcher application 120 also subscribes to selected presentities 130 with the presence server 102 and receives updates on presence information (e.g. location, status of a presentity). Watcher application 120 may receive the updates from presence server 102, directly from presentity store 106, or from presentity group management component 238.

Presentity group management component 238 is configured to categorize presentities based on their types and manage the groups in coordination with presence server 102. In addition, directory service 236 may optionally coordinate operations of presentity group management component 238 as well.

Presence server 102, in coordination with directory service 236, manages presentity store 106 where status information associated with registered presentities 130 is stored. Essentially, presence server 102 enforces rules of the service provider on categorizing presentities, while watcher application 120 enforces client (user) rules. As mentioned above, the interactions between the components of the personal presentity presence subsystem may be facilitated within an IMS framework using SIP sessions. A basic example scenario is provided below for illustration purposes.

According to the example scenario, a presence service may support two types of personal presentities 130: a monitoring system interface device (car alarm equipped with a camera) and entry system interface devices (doorbells equipped with visual and audio communication devices). The presentities 130 are personal presentity, because they are personally associated with the user. They are not a generic resource that may be shared by subscribers of a presence service. Each type of personal presentity has different actions associated with it such as "take picture" for car alarm, and "audio call" or "video call" for the doorbell. Thus, each type of personal presentity has different applications that need to be activated to perform the associated action(s). When the personal presentities are added to the system, their manifests includes their types (e.g. car alarm, doorbell), which identifies them as personal presentity types. The network addresses of the associated applications (e.g. IP addresses for client image acquisition application, VoIP call client, video conference client, and the like), any parameters associated with the applications, and icons for the actions may also be stored in presentity manifest store 240.

Under each type, there may be numerous presentities 130 (e.g. three separate car alarms, front and back doorbells, etc.). Each presentity 130 within a group (type) may have differing configurations, but their essential structure is similar enough to group them together. For example, the front doorbell presence hardware may include a display for video communication, but the back doorbell presence hardware may lack the display. Presence server 102 in coordination with presentity group management 238 may categorize added personal presentities once they are registered with the presence server 102 by presence application 232. When the presentity manifest store 240 is updated, watcher application 120 may be dynamically updated to reflect the latest configuration for different presentity types.

Watcher application 120 then receives updates on the personal presentities from the presence server 102. In response to the received updates, watcher application 120 may select an associated action (e.g. initiate an audio call with a person at the door in response to the doorbell being rung). Presence server 102 in coordination with presence application 232 may then manage activation of the appropriate client application and facilitate the execution of the action.

The architecture and scenarios described in FIG. 1 and FIG. 2 are for illustration purposes only and do not constitute a limitation on embodiments. Other configurations of a personal presentity presence subsystem may be implemented without departing from a scope and spirit of the present invention.

Figure 3:
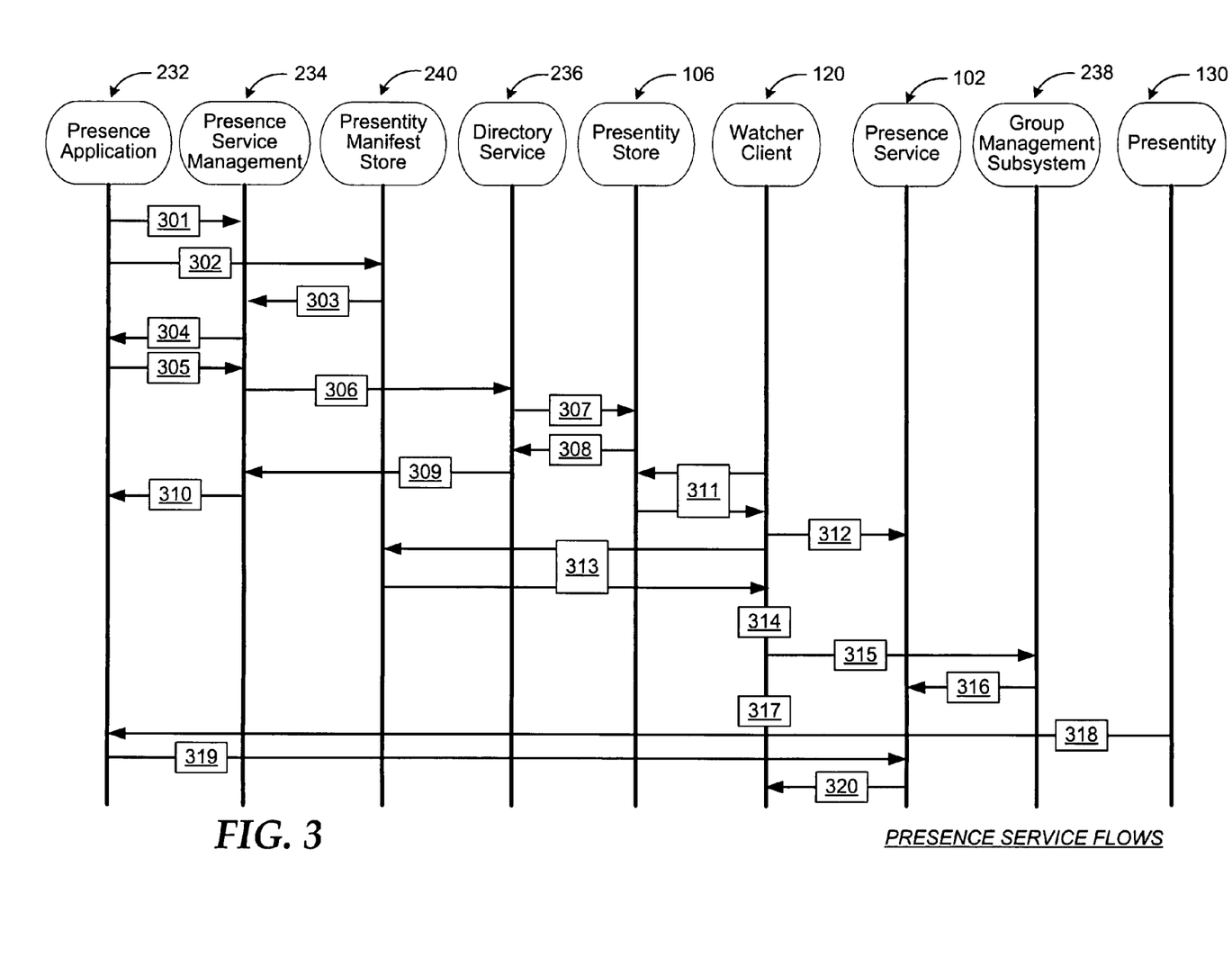
FIG. 3 illustrates action flows in the example personal presentity presence subsystem of FIG. 2.

FIG. 3 illustrates action flows in the example personal presentity presence subsystem of FIG. 2. The interactions are between components the doorbell presence service described above in detail.

The action flow begins with action 301, where presence application 232 performs an initial registration of a personal presentity type that includes the manifest information discussed above in conjunction with FIG. 2. The presence application 232 registers the personal presentity type with presence service management component 234. Presence application 232 then stores the manifest information with presentity manifest store 240 in action 302. Actions 303 and 304 are respective responses of presentity manifest store 240 and presence service management component 234 that registration is complete. Upon receiving the registration complete message, presence application 232 registers a personal presentity with presence service management component 234 in action 305. In response, presence service management component 234 registers the personal presentity with directory service 236 in action 306. Following that, directory service 236 registers the personal presentity with presentity store 106 in action 307 and receives a registration complete message in action 308. The involvement of the directory service 236 is optional according to some embodiments. The registration complete message is forwarded to presence service management component 234 in action 309 and from there to presence application 232 in action 310.

In the meantime, watcher application 120 retrieves personal presentities or other classes of presentities 130 from presentity store 106 in actions 311. Watcher application 120 then subscribes to presentities 130 by type with presence server 102 in action 312. Following the subscription, watcher application 120 retrieves the manifest(s) for the subscribed presentities 130 from presentity manifest store 240 in actions 313. The retrieval of the updated manifests results in dynamic reconfiguration of the watcher application 120 in action 314, which may include updating one or more UIs, application parameters, links, and the like.

According to some embodiments, watcher application 120 may request subscription to a buddy list with group management subsystem 238 in action 315. Upon receiving this request, group management subsystem 238 may subscribe the watcher application 120 to personal presentities in the requested buddy list in action 316. This may result in a dynamic reconfiguration of the watcher application 120 based on the types of presentities 130 in the buddy list in action 317. The term "buddy list" is used herein in a generic sense to describe a group within a particular type of presentities 130. For example, a user may be authorizes to car alarms for a fleet of automobiles including personal vehicles and vehicles of his organization. The user may then define a "buddy list" of his/her personal cars within the car alarm type of presentities 130.

In action 318, presentity 130 provides presence application 232 with presence information. This may include information such as a doorbell ringing status, a car alarm status, availability of a person for phone call, and the like. The presence application 232 updates presence server 102 with the information from the personal presentity in action 319. Presence server 102 then updates watcher application 120 in action 320. Operations associated with personal presentities are not limited to those described above. Additional actions may be included within the actions described here or after the last action. For example, the user may select an action associated with the received presence information. The selection may then be forwarded to presence application, which may activate one or more applications to execute the user selected action.

Figure 4:
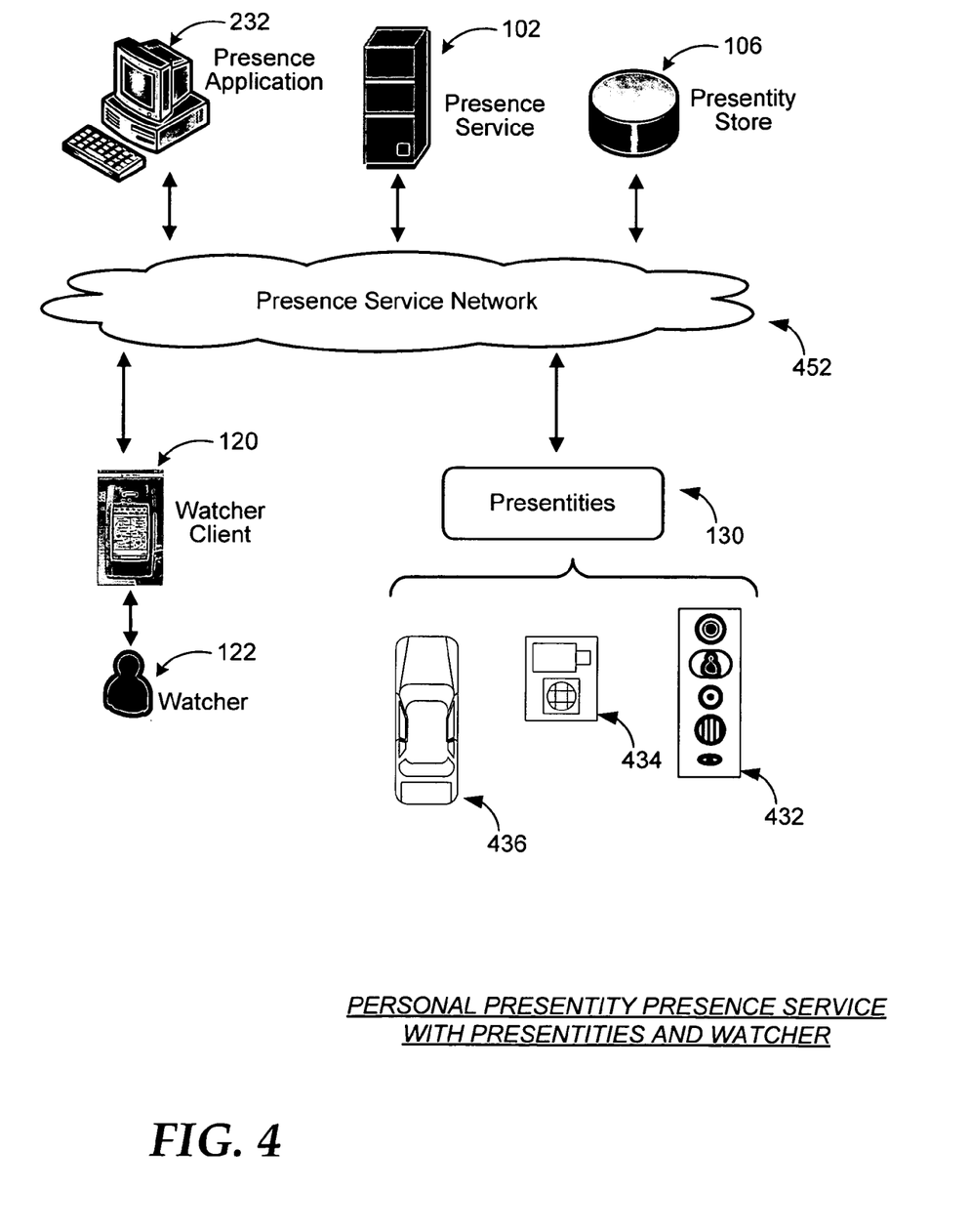
FIG. 4 illustrates a diagram of a personal presentity presence service with personal presentities and a watcher.

FIG. 4 illustrates a diagram of a personal presentity presence service with personal presentities 130 and a watcher 122. Presence server 102 and presentity store 106 are as described in FIG. 1. Presence application 232 manages associated personal presentities 130 and facilitates execution of a user selected action in response to provided presence information. Presence server 102, presentity store 106, and presence application 232 communicate with each other, with watcher application 120, and with presentities 130 through presence network 452. As discussed previously, presence network 452 may include an SIP session IMS infrastructure, wired or wireless networks, and the like.

Presentities 130 may include a number of personal presentities associated with watcher 122 personally. Examples of personal presentities 130 represented in the diagram are doorbell presence hardware 432, monitoring system 434, and car alarm 436. Any other type of device or system that is personally associated with watcher 122 and can provide presence information to the watcher 122 may be a personal presentity 130. In a conventional presence system, presentities 130 may be persons. Thus presentation of presentities 130 in watcher application 120 may be accordingly. For example, watcher application 120 may provide choices to the watcher to establish a phone call, a video call, or display a location of the presentity person.

On the other hand, presentation of personal presentities 130 may be associated with significantly different choices for the watcher 122. The selection of actions in response to presence information may typically depend on capabilities and features of a specific personal presentity. For example, a monitoring system may be set up to monitor several equipment and processes. Thus, personal presentities within the group of monitoring presentities may have different features depending on what is being monitored. A test equipment monitoring device may provide results of tests, duration of tests, and the like. Associated actions may include recording the readings, resetting the test equipment, modifying parameters of the test equipment, and the like. In another example, the personal presentity may include a weather monitoring device that provides automatic updates on weather conditions such as temperature, humidity, precipitation, and the like. Upon registering the type of presentity 130 and subscribing the watcher to it, the presence server 102 may reconfigure the watcher application 120 (or the watcher application can automatically reconfigure itself) to present a selection of actions associated with the weather monitoring presentity. The actions may include resetting modules of the presentity 130, changing recording parameters, and the like.

According to some embodiments, users may override or regroup personal presentities identified by the system into customizable groups for presentation and/or management purposes. In the other words, the system may identify personal presentities and place them into the user's personal presentity group or into subgroups like "office", "home", and the like.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 5:
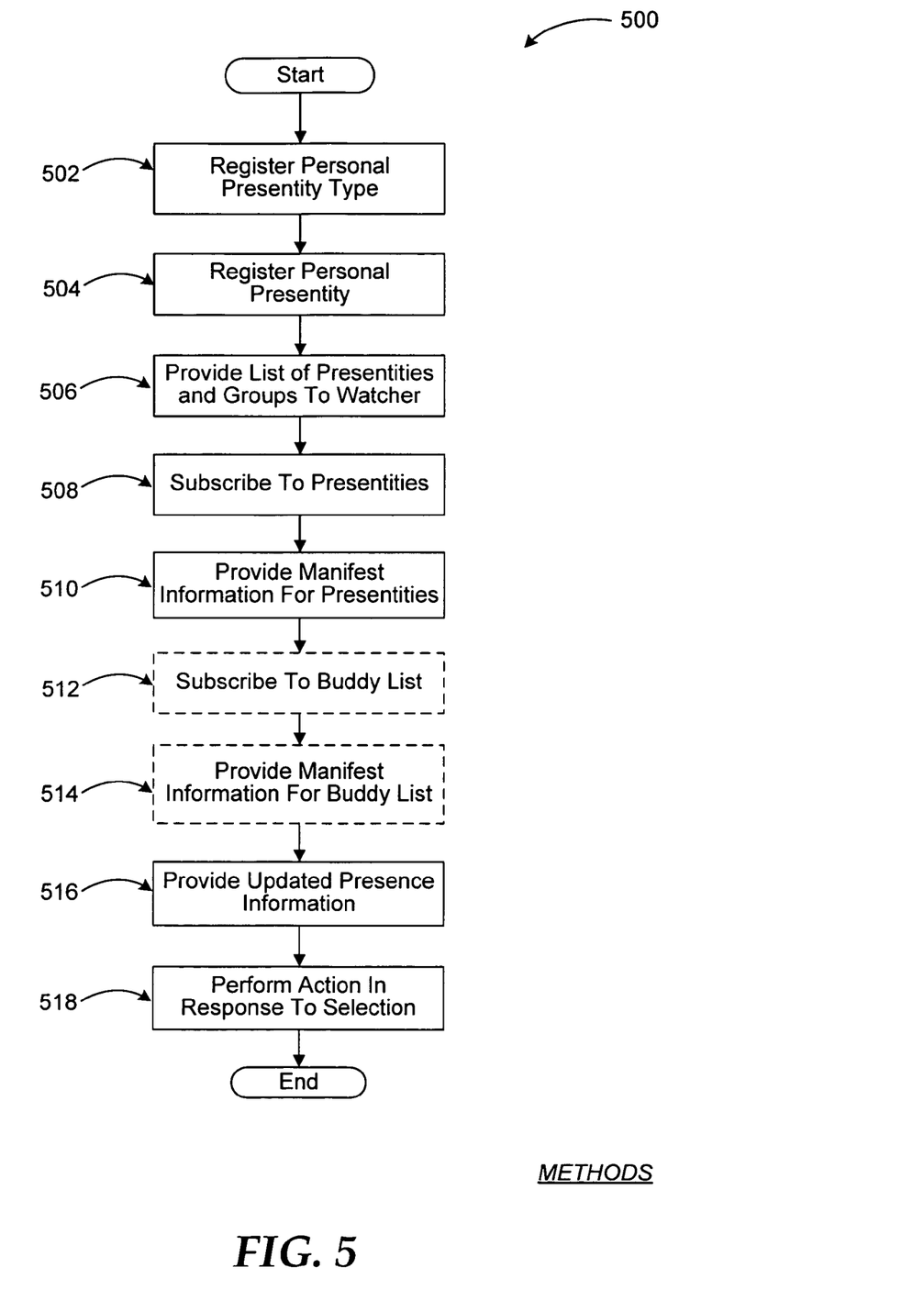
FIG. 5 illustrates a logic flow diagram for a process of providing personal presentity presence service according to one embodiment.

FIG. 5 illustrates a logic flow diagram for a process 500 of providing personal presentity presence service according to one embodiment. Process 500 may be implemented in presence server 102.

Process 500 begins with operation 502, where presence service management component 234 registers a personal presentity type in response to receiving a request for registering the presentity type from presence application 232. The registration may include storing information associated with the presentity type such as name of the type, addresses of applications associated with related actions, icons to be presented in a watcher application UI for the presentity type, and the like. Processing moves from operation 502 to operation 504. Presence service management component 234 may register the information with presentity manifest store 240.

At operation 504, the presence service management component 234 registers a presentity 130 of a registered type with presentity store 106 in response to a request to register a new presentity 130 from the presence application 232. Processing moves from operation 504 to operation 506.

At operation 506, presentity store 106 provides a list of available presentities and groups of categorized presentities to watcher application 120. According to some embodiments, presence application 232 may filter the list based on an authorization attribute associated with each presentity 130. For example, personal presentities may be made available only to users associated with those personal presentities. Watcher application 120 may then provide a request for subscription to selected presentities 130. Processing moves from operation 506 to operation 508.

At operation 508, the presence service management component 234 subscribes the watcher application 120 with the requested personal presentities in presentity store 106 and confirms the subscription to the requesting watcher application 120. Processing moves from operation 508 to operation 510.

At operation 510, presentity manifest store 240 provides the manifests of the personal presentities in the list of subscribed presentities to the watcher application 120. Upon receiving the manifests of the personal presentities, the watcher application 120 may be dynamically configured based on the types of presentities 130 in the subscribed list. Processing moves from operation 510 to optional operation 512.

At optional operation 512, the presence service management component 234 subscribes the watcher application 120 with one or more requested buddy lists comprising a plurality of personal presentities and confirms the subscription to the requesting watcher application 120. Processing moves from optional operation 512 to optional operation 514.

At optional operation 514, presentity manifest store 240 provides the manifests of the personal presentities in the subscribed buddy list to the watcher application 120. Upon receiving the manifests of the personal presentities in the buddy list, the watcher application 120 may be dynamically reconfigured based on the types of presentities 130 in the subscribed buddy list. Processing moves from optional operation 514 to operation 516.

At optional operation 516, presence server 102 provides updates received from various presentities 130 to presence application 232, which in turn provides them to watcher application 120. The updates may include presence information such as location or availability of a presentity 130, a trigger event associated with the presentity 130, and the like. Processing moves from operation 516 to operation 518.

At operation 518, presence application 232 facilitates an action selected by the watcher 122 in response to the updated presence information. Facilitating the action may include, as described previously, activating one or more client applications that perform tasks such as establishing communications, activating controls, and the like. After operation 518, processing moves to a calling process for further actions.

The operations included in process 500 are for illustration purposes. Providing personal presentity presence service may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above.

Rather, the specific features and acts described above are disclosed as example forms of implementing the claims and embodiments.

What is claimed is:

1. A method for providing distributed communication services between a watcher and a plurality of presentities, the method comprising: receiving, by a computing device, descriptions of available presentities that publish presence information about themselves, wherein the available presentities include a set of classes comprising a person and an inanimate presentity associated with the person, wherein the inanimate presentity associated with the person includes a monitoring device and comprises an interface device which provides a service to the watcher; wherein descriptions of available inanimate presentities include a designation of a type of inanimate presentity associated with each available inanimate presentity and a list of associated actions that are graphically selectable by the watcher when a presence notification has been received for the inanimate presentity associated with a particular type of inanimate presentity, a selection of an associated action thereby causing execution of the action selected, wherein the selected action is executed by the interface device of the inanimate presentity;

creating a group of inanimate presentities by automatically grouping the available inanimate presentities based on the type of inanimate presentity shared amongst the group; and providing a user interface of a watcher application that includes a user option to the watcher to create a sub-grouping within each inanimate presentity type, wherein the user interface is dynamically reconfigured to provide updated actions associated with a newly subscribed inanimate presentity by the watcher, wherein the updated actions are selectable by the watcher and the newly subscribed inanimate presentity is of a type different from other types of inanimate presentities previously subscribed by the watcher.

2. The method of claim 1, further comprising: receiving a request for subscription to the group of inanimate presentities; subscribing the watcher to the group of inanimate presentities; and dynamically reconfiguring the user interface of the watcher application in response to the subscribing of the watcher to the group of inanimate presentities.

3. The method of claim 2, further comprising:
presenting the watcher with a list of actions associated with the group of inanimate presentities.

4. The method of claim 3, wherein presenting the watcher with the list of actions includes reconfiguring the user interface of the watcher application based on features and capabilities of a subscribed inanimate presentity.

5. The method of claim 1, wherein the descriptions of the available inanimate presentities include at least one from a set of: a name for each description, an address of at least one application associated with an action related to a particular inanimate presentity type, at least one parameter associated with the application, at least one icon to be used in the user interface of the watcher application, and an authorization definition.

6. The method of claim 1, further comprising:
activating an application associated with one of the available inanimate presentities in response to a selection of an associated action by the watcher.

7. The method of claim 1, further comprising:
dynamically modifying the group of the available inanimate presentities in response to a change in a state of at least one of the available inanimate presentities.

8. The method of claim 1, further comprising:
grouping the available inanimate presentities based on one of: a set of presence service provider rules and a set of watcher rules.

9. The method of claim 1, further comprising receiving a user input from the watcher to create a sub-group within the inanimate presentity type, the sub-group being a subset of the presentities of the inanimate presentity type.

10. A system for providing distributed access services in a presence system between a watcher and a personal presentity, comprising:

a presence service management component configured to:
in response to a request from a presence application, register a presentity class with a presentity manifest store, wherein the presentity class includes an inanimate presentity associated with a person and a person, the inanimate presentity associated with the person including a monitoring device; and register any inanimate presentity of a registered class that is added to the presence system with a presentity store;

a presence server configured to:
subscribe a watcher application to a requested group of inanimate presentities based on a type of the inanimate presentities such that the watcher application is dynamically configured based on presentity manifest information associated with the inanimate presentities in the group; and in response to receiving updated presence information from the inanimate presentities belonging to the requested group, provide the updated presence information to the watcher application subscribed to the requested group; and a group management component configured to provide a user interface of the watcher application that includes a user option to create a buddy list within each inanimate presentity type, wherein the user interface is dynamically reconfigured to provide updated actions associated with a newly subscribed inanimate presentity by the watcher, wherein the updated actions are selectable by the watcher when a presence notification has been received for a particular inanimate presentity and the newly subscribed inanimate presentity is of a type different from other types of inanimate presentities previously subscribed by the watcher, wherein an action selected is executed by an interface device of the inanimate presentity.

11. The system of claim 10, further comprising:
a directory service configured to:
receive a presentity registration request from the presence application; and manage the registration of the presentity with the presentity manifest store.

12. The system of claim 10, the group management component further configured to:
receive a request for subscription to a buddy list of inanimate presentities from the watcher application; and
subscribe the watcher application to the requested buddy list of inanimate presentities based on the type of the inanimate presentities in the group.

13. The system of claim 12, wherein the watcher application is dynamically reconfigured based on the type of the inanimate presentities in the buddy list.

14. The system of claim 12, wherein the group management component is further configured to group the inanimate presentities based on at least one of: a set of service provider rules provided by the presence service and a set of user rules provided by the watcher application.

15. The system of claim 12, wherein the presence service, the presence service management component, and the group management component are configured to communicate through one or more session initiation protocol sessions using an internet protocol multimedia system infrastructure.

16. The system of claim 10, wherein the inanimate presentities include at least one from a set of: a monitoring device, an alarm system, an entry system, and a control system associated with the watcher that are configured to communicate with the presence application through one of a wired and wireless network.

17. A non-transitory computer storage medium encoding a computer program of instructions for executing the following process:
retrieving descriptions of available presentities associated with a presence service, the descriptions including a person class and an inanimate presentity class associated with a person, the inanimate presentity class associated with the person including a monitoring device;
subscribing a watcher application to a group of inanimate presentities among the available presentities, the inanimate presentities in the group sharing a common type of inanimate presentity;
providing manifest information associated with each of the inanimate presentities in the group to which the watcher application is subscribed such that the watcher application is dynamically configured based on the manifest information associated with the inanimate presentities in the group;
providing presence information from the inanimate presentities in the group to which the watcher application is subscribed; and
providing a user interface of the watcher application that includes a user option to create at least one sub-grouping within each inanimate presentity type, wherein the user interface is dynamically reconfigured to provide updated actions associated with a newly subscribed inanimate presentity by the watcher, wherein the updated actions are selectable by the watcher when a presence notification has been received for a particular inanimate presentity and the newly subscribed inanimate presentity is of a type different from other types of inanimate presentities previously subscribed by the watcher, wherein an action selected is executed by an interface device of the inanimate presentity.

18. The non-transitory computer storage medium encoding a computer program of instructions of claim 17, further comprising:
registering a new inanimate presentity type based on a capability and at least one feature of a new inanimate presentity of the type to be registered; and
registering new inanimate presentities under a group based on the newly registered inanimate presentity type.

19. The non-transitory computer storage medium encoding a computer program of instructions of claim 17, further comprising:
receiving a selected action associated with the provided presence information from the watcher application; and
performing the selected action by activating at least one client application associated with the inanimate presentity that provided the presence information.

20. The non-transitory computer storage medium encoding a computer program of instructions of claim 17, further comprising:
automatically providing updated manifest information to the watcher application in response to one of: addition of a new inanimate presentity type, removal of an existing inanimate presentity type, and modification of manifest information associated with the inanimate presentity type.

* * * * *